(12) United States Patent
Cavallotti

(10) Patent No.: US 8,606,547 B2
(45) Date of Patent: Dec. 10, 2013

(54) METHOD AND SYSTEM FOR MEASURING THE AERODYNAMIC NOISE OF A VEHICLE

(75) Inventor: Gabriele Cavallotti, Castelfranco Emilia (IT)

(73) Assignee: Ferrari S.p.A., Modena (IT)

( * ) Notice: Subject to any disclaimer, the term of this patent is extended or adjusted under 35 U.S.C. 154(b) by 764 days.

(21) Appl. No.: 12/664,878

(22) PCT Filed: Aug. 24, 2007

(86) PCT No.: PCT/IT2007/000593
§ 371 (c)(1),
(2), (4) Date: Sep. 7, 2010

(87) PCT Pub. No.: WO2008/152667
PCT Pub. Date: Dec. 18, 2008

(65) Prior Publication Data
US 2011/0015879 A1   Jan. 20, 2011

(30) Foreign Application Priority Data
Jun. 15, 2007   (IT) .............................. B02007A0424

(51) Int. Cl.
*H03F 1/26*   (2006.01)
(52) U.S. Cl.
USPC ........................................................ 702/191
(58) Field of Classification Search
USPC ........................................................ 702/191
See application file for complete search history.

(56) References Cited

U.S. PATENT DOCUMENTS

| | | | | |
|---|---|---|---|---|
| 4,037,052 A | * | 7/1977 | Doi | ............................ 381/160 |
| 6,550,332 B2 | * | 4/2003 | Lee | ............................... 73/583 |
| 2003/0154054 A1 | | 8/2003 | Charette et al. | |
| 2004/0154715 A1 | * | 8/2004 | Dufournier | ............... 152/154.2 |
| 2004/0226379 A1 | * | 11/2004 | Ochwat et al. | .................. 73/587 |
| 2010/0082201 A1 | * | 4/2010 | Pfau et al. | ....................... 701/36 |

FOREIGN PATENT DOCUMENTS

| | | |
|---|---|---|
| DE | 28 54 238 | 6/1980 |
| DE | 103 51 792 | 6/2005 |
| EP | 1 450 150 | 8/2004 |

OTHER PUBLICATIONS

International Search Report for International Application No. PCT/IT2007/000593, European Patent Office, Jul. 18, 2008, pp. 3.

* cited by examiner

*Primary Examiner* — Aditya Bhat
(74) *Attorney, Agent, or Firm* — Bryan A. Santarelli; Graybeal Jackson LLP

(57) ABSTRACT

A method and a system for measuring the aerodynamic noise of a vehicle; the system is provided with: a measuring station, which is adapted to receive the vehicle and is provided with a supporting element; at least one blower carried by the supporting element and adapted to generate an air jet towards the vehicle; an actuating device for displacing the supporting element with respect to the vehicle; at least one phonometer for measuring the aerodynamic noise produced by the vehicle struck by the air jet generated by the blower; a position sensor for detecting the position of the supporting element with respect to the vehicle; and a processing unit connected to the phonometer and to the position sensor for correlating the aerodynamic noise measurements supplied by the phonometer with the position of the supporting element with respect to the vehicle.

15 Claims, 4 Drawing Sheets

METHOD AND SYSTEM FOR MEASURING THE AERODYNAMIC NOISE OF A VEHICLE

PRIORITY CLAIM

The present application is a United States national phase application filed pursuant to 35 USC §371 of International Patent Application Serial No.: PCT/IT2007/000593, filed Aug. 24, 2007; which application claims priority to Italian Patent Application Serial No.: B02007A000424, filed Jun. 15, 2007; which foregoing applications are incorporated herein by reference in their entireties.

TECHNICAL FIELD

An embodiment of the present invention relates to a method and to a system for measuring the aerodynamic noise of a vehicle.

Top-range cars constitute a very small segment of the automotive market and are thus manufactured in limited numbers. Accordingly, top-range cars are assembled on assembly lines with a low degree of automation in which most of the assembly operations are performed manually because the limited number of such cars does not allow an adequate amortization of the costs of a highly automated assembly line. Accordingly, during the assembly of a high-range car, minor errors or assembly inaccuracies may be committed which, when occurring on external parts, may cause the onset of anomalous aerodynamic noise during use. Furthermore, a possible anomalous aerodynamic noise may be acceptable in a low-range car, i.e. in a low-cost car, but may be unacceptable and very annoying for the end user in a top-range car, i.e. in a very expensive car.

Nowadays, in order to verify that a car is free from anomalous aerodynamic noises, the car is road-tested by an expert test driver who listens for anomalous aerodynamic noises. However, this inspection is highly subjective and consequently its satisfactory outcome is entirely entrusted to the test driver's ability, it cannot be performed on rainy days because the noise of the rain covers possible anomalous aerodynamic noises, and is very expensive because an expert test driver is employed for a rather long time (the car must reach a significant speed in order to allow the onset of possible anomalous aerodynamic noises). Furthermore, the test driver who performs the above-mentioned inspection is capable of indicating the presence of an anomalous aerodynamic noise but often is not able to accurately identify the zone of the car which generates such anomalous aerodynamic noise; accordingly, the identification of the zone of the car which generates the anomalous aerodynamic noise to arrange for its repair may be long and complicated.

Patent application DE10351792A1, which is incorporated by reference, describes a system for monitoring the aerodynamic noise of a car. Such a system comprises a mobile portal, which is provided with a plurality of blowers for generating a plurality of air jets towards a car arranged inside the portal and a conveyor for displacing the gantry with respect to the car; the aerodynamic noise generated by the car which is struck by the air jets blown by the gantry is detected by an operator stationed near the car, either subjectively (i.e. by ear) or objectively (by means of a portable phonometer handled by the operator him or herself).

Patent application US2004226379A1, which is incorporated by reference, describes a further system for monitoring the aerodynamic noise of a car. Such a system contemplates the use of at least one transportable blower which is manually maneuvered by an operator; the aerodynamic noise generated by the car which is struck by the air jets blown by the portal is detected by an operator stationed near the car, either subjectively (i.e. by ear) or objectively by means of a portable phonometer handled by the operator him or herself.

The systems described in patent applications DE10351792A1 and US2004226379AI may solve the problem of necessarily conducting a. road test for measuring possible anomalous aerodynamic noises; however, the detections obtained by such systems may be strongly affected by the ability of the operator who must be capable of using the portable phonometer correctly because the measurement of a portable phonometer is highly influenced by the position and the orientation of the portable phonometer itself with respect to the car.

SUMMARY

An embodiment of the present invention provides a method and a system for measuring the aerodynamic noise of a vehicle, which are free from the drawbacks described above and are at the same time easy and cost-effective to make.

BRIEF DESCRIPTION OF THE DRAWINGS

One or more embodiments of the present invention will now be described with reference to the accompanying drawings which illustrate one or more non-limitative embodiments thereof, in which.

DETAILED DESCRIPTION

Figure 1:
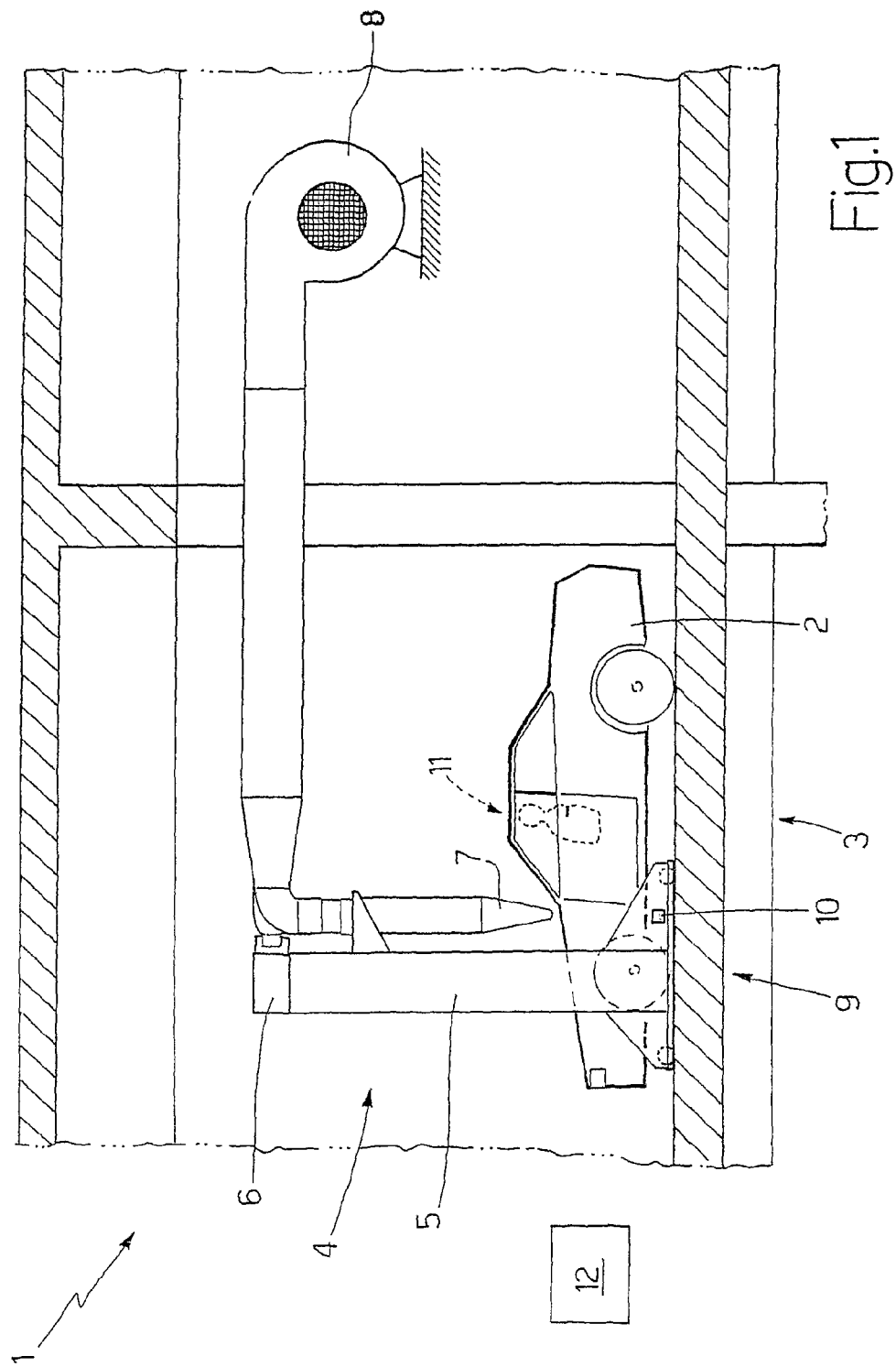
FIG. 1 is a diagrammatic, side view with parts removed for clarity of a system for measuring the aerodynamic noise of a vehicle made according to an embodiment of the present invention.
Figure 2:
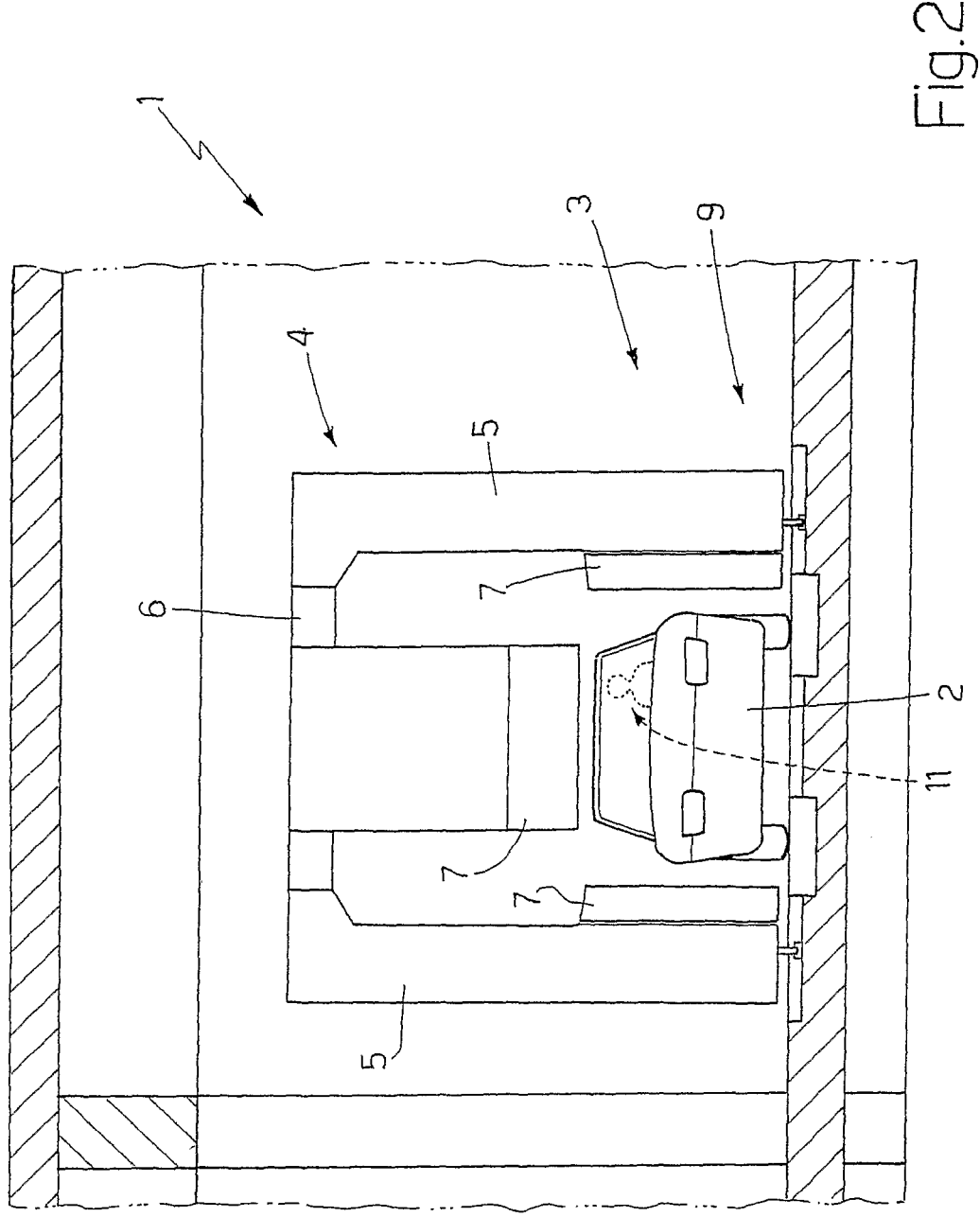
FIG. 2 is a diagrammatic, front view with parts removed for clarity of an embodiment of the system in FIG. 1.
Figure 3:
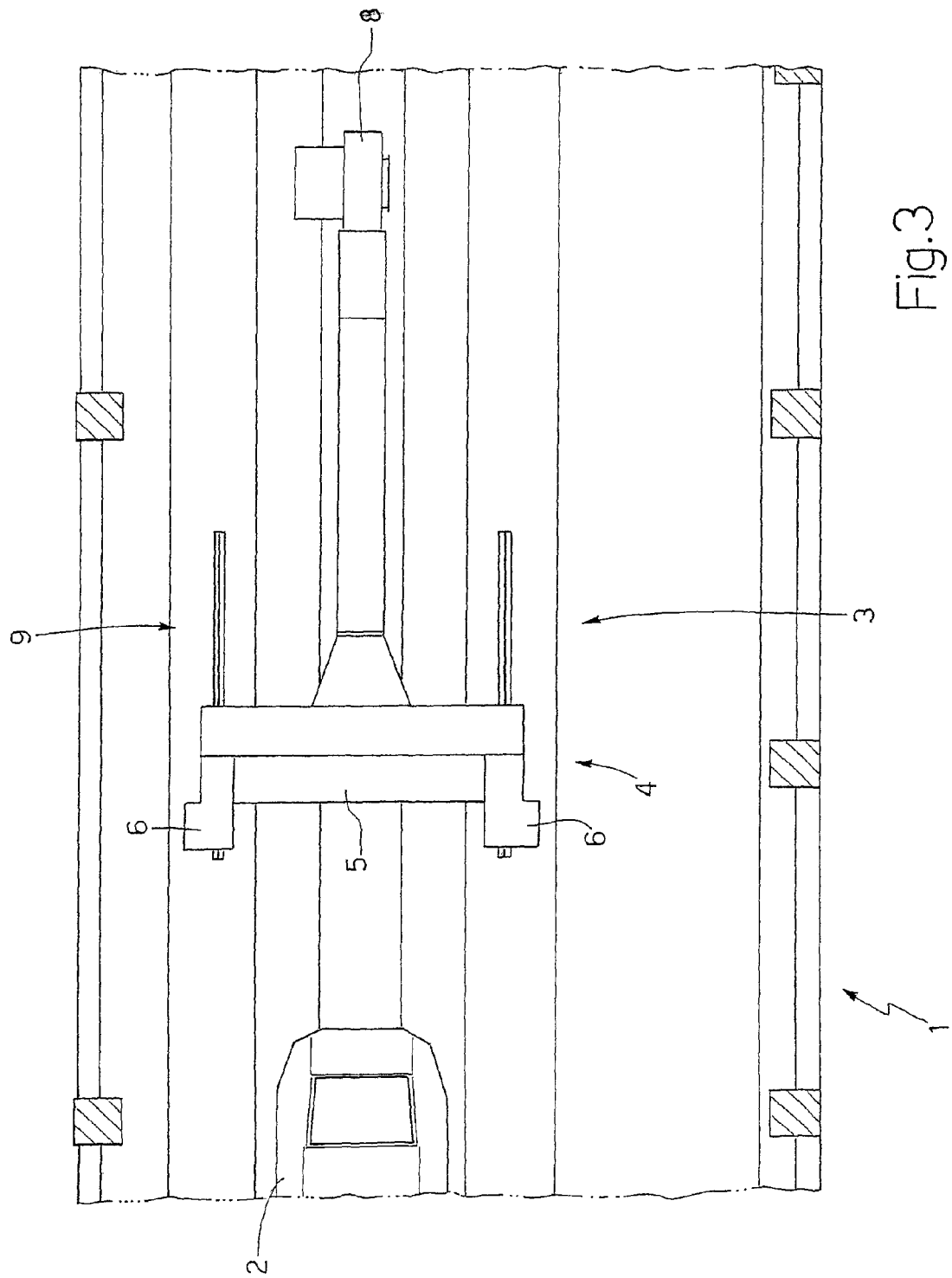
FIG. 3 is a diagrammatic, plan view with parts removed for clarity of an embodiment of the system in FIG. 1.
Figure 4:
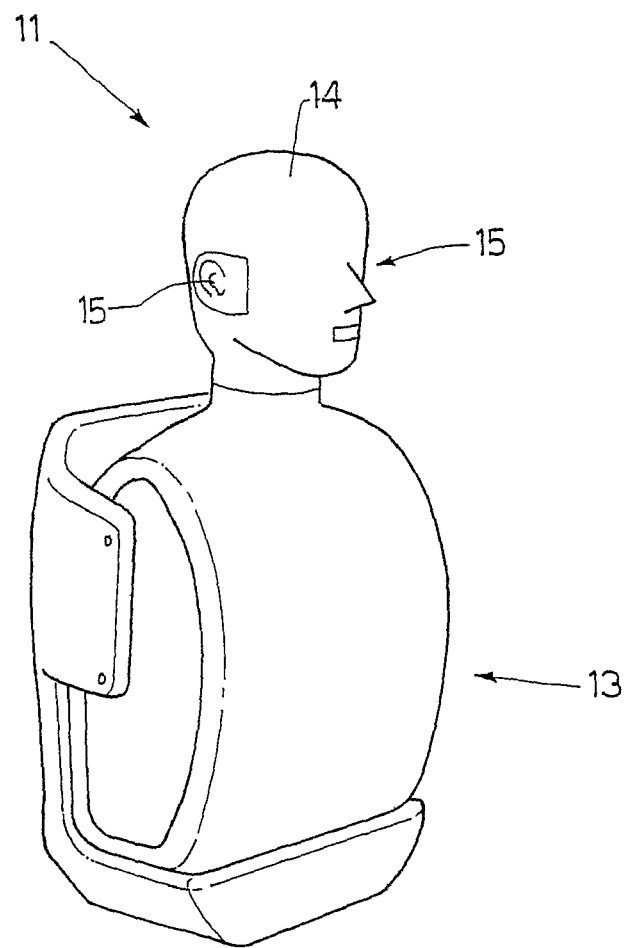
FIG. 4 is a diagrammatic, perspective view of an embodiment of an anthropomorphic phonometer used in the system in FIG. 1.

In FIG. 1, numeral 1 indicates as a whole an embodiment of a system for measuring the aerodynamic noise of a vehicle 2. The system 1 comprises a measuring station 3, which is adapted to receive the vehicle 2 for measuring the aerodynamic noise. The measuring station 3 is provided with a supporting element 4, which is portal-shaped and comprises two vertical uprights 5 superiorly joined by a horizontal crossbar 6. The supporting element 4 carries three blowers 7: a central blower 7 fixed to the crossbar 6 and two side blowers 7 fixed to the uprights 5; each blower receives compressed air from a common compressor 8 and is adapted to generate an air jet which is directed towards the vehicle 2 and strikes the vehicle 2 itself.

Furthermore, the system 1 comprises a motorized actuation device 9, which is adapted to longitudinally displace the supporting element 4 with respect to the vehicle 2 arranged in the measuring station 3 from an initial position to a final position. According to an embodiment shown in the accompanying figures, the vehicle 2 arranged in the measuring station 3 remains static and the actuation device 9 displaces the supporting element 4; alternatively, the supporting element 4 may be maintained static while the actuating device 9 displaces the vehicle 2. A. position sensor 10, which is adapted to detect the position of the supporting element 4 with respect to the vehicle 2, is coupled to the actuating device 9.

Finally, the system 1 may comprise at least one phonometer 11 for measuring the aerodynamic noise produced by the vehicle 2 struck by the air jet generated by the blowers 7 and a processing unit 12 connected to the phonometer and to the position sensor 10 for correlating the aerodynamic noise measurements supplied by the phonometer 11 with the position of the supporting element 4 with respect to the vehicle 2, so that each aerodynamic noise measurement is associated with the position of the supporting element 4 with respect to the vehicle 2 at the time the aerodynamic noise itself is measured.

According to a preferred embodiment shown in the accompanying figures, the phonometer 11 is arranged inside the vehicle 2 on the front driver's seat before starting the measurements and is of the anthropomorphic type; in other words, the phonometer 11 comprises an anthropomorphic dummy 13, which is adapted to be arranged in a seat of the vehicle 2 and is provided with a head 14, and a pair of microphones 15', which are fixed to the head 14 at the position occupied by the ears. The anthropomorphic dummy 13 may a so-called head-torso", i.e. it presents a lower portion which reproduces the torso of a person and an upper portion which reproduces the head of a person. As the phonometer 11 has two separate microphones 15 (right and left, respectively), it may carry out a stereophonic measurement of the aerodynamic noise thus distinguishing between the noise received by the right microphone 15 and the noise received from the left microphone 15.

The operation of the system 1 for measuring the aerodynamic noise of a vehicle 2 arranged in the measuring station 3 is described below.

An acceptability threshold of the aerodynamic noise produced by the vehicle 2 is set before starting the measurement; if the aerodynamic noise produced by the vehicle 2 is maintained below the acceptability threshold during the measurement of the aerodynamic noise, then the vehicle 2 is considered compliant with manufacturing specifications, otherwise the vehicle 2 is identified as faulty and thus in need of a repair intervention. The acceptability threshold of the aerodynamic noise produced by the vehicle 2 is generally identical for the two right and left stereophonic channels, it depends on the speed of the air output by the blowers 7 (the faster the speed of the air output by the blowers 7, the higher the acceptability threshold) and may be either constant or variable according to the position of the supporting element 4 with respect to vehicle 2; in other words, for example, when the air jets generated by the blowers 7 strike the zone of the front hood of the vehicle 2 an aerodynamic noise acceptability threshold value different from that when the air jets generated by the blowers 1 strike the zone of the front doors or the rear hood may be used.

The measurement of the aerodynamic noise of the vehicle 2 arranged in the measuring station 3 contemplates activating the blowers 7 for generating the air jets which strike the vehicle 2 and concurrently displacing the supporting element 4 with respect to the vehicle 2 from an initial position, in which the element 4 is generally arranged in front of the vehicle 2, to a final position, in which the supporting element 4 is generally arranged behind the vehicle 2, by means of the actuation device 9.

During the displacement of the supporting element 4 with respect to the vehicle 2, the processing unit 12 detects the measurement of aerodynamic noise supplied by the phonometer 11 and measures the position of the supporting element 4 with, respect to the vehicle 2 supplied by the position sensor 1; in this manner, the processing unit 12 may correlate the aerodynamic noise measurements supplied by the phonometer 11 with the position of the supporting element 4 with respect to the vehicle 2 so that each aerodynamic noise measurement is associated with the position of supporting element 4 with respect to the vehicle 2 at the time when the aerodynamic noise itself is measured.

In this manner, when an anomalous aerodynamic noise is measured (i.e. a measurement which exceeds the corresponding acceptability threshold), the processing unit 12 is capable of indicating not only the anomalous measurement, but also the position of the supporting element 4 (i.e. of the blowers 7) with respect to the vehicle 2 at the time when the anomaly was measured and possibly of indicating if the anomalous measurement occurred at the same time on both stereophonic channels or only on one of the two stereophonic channels. Accordingly, the repairer of the vehicle 2 not only receives the information that the vehicle 2 presents an anomalous aerodynamic noise, but that, for example, the anomalous aerodynamic noise occurred when the blowers 7 were at the front hood zone and only on the right side of the vehicle 2 (i.e. in the right stereophonic channel); in this manner, the repairer of the vehicle 2 is greatly assisted in identifying the part of the vehicle 2 on which to intervene.

The actuating device 9 may displace the supporting element 4 with respect to the vehicle 2 with an intermittent advancement in discrete steps which alternates a step of moving for the transition from a current position to a subsequent position and a step of halting; the measurement of the aerodynamic noise, produced by the vehicle 2 struck by the air jet generated by the blowers 7 is performed only during the steps of halting. During the steps of moving, the air jets generated by the blowers 7 may be stopped or attenuated to reduce the mechanical stresses to which the supporting element 4 is subjected during the movement. Alternatively, the actuation device 9 may displace the supporting element 4 with respect to the vehicle 2 with a continuous advancement (i.e. without steps of halting) at an either constant or variable speed (i.e. at a non-null speed which may have an either constant or variable value).

According to an embodiment shown, the relative displacement between the supporting element 4 and the vehicle 2 occurs in longitudinal direction (i.e. from the front backwards or vice versa); however, the relative displacement between the supporting element 4 and the vehicle 2 may also occur in transversal sense (i.e. from left to right, or vice versa).

According to the above, the aerodynamic noise detected by the phonometer 11 may be solely compared with a maximum acceptability threshold. Alternatively, the aerodynamic noise detected, by the phonometer 11 may also be compared with a minimum acceptability threshold, which may have the sole purpose of allowing a self-test of the correct operation of the system 1; in other words, due to its physical features, when struck by certain air jets generated by the blowers 7, the vehicle 2 inevitably produces a certain noise and if such a noise is not detected by the phonometer 11 then there may be a fault or an incorrect calibration in the system 1.

In an embodiment shown in the accompanying figures, a single anthropomorphic phonometer which is arranged on the front driver's seat, is used; obviously, several anthropomorphic phonometers 11 (not more than 4) variably distributed in the seats of the vehicle 2 may also be used.

An embodiment of the system 1 for measuring the aerodynamic noise presents many advantages, because it is simple and cost-effective to make and, above all, allows one to obtain an objective (i.e. not affected and not affectable by the manual ability of operators), automatable, rapid and easily repeatable measurement of the aerodynamic noise produced by a vehicle 2. Furthermore, in case of an anomaly in the aerodynamic noise generated by a vehicle 2, an embodiment of the system 1 is capable not only of indicating the fault, but also of indicating the zone (both longitudinally and transversally) of the vehicle 2 which may be responsible for the anomaly; in this manner, an operator—is greatly assisted in the intervention to eliminate the anomaly. Finally, the fact of using an anthropomorphic phonometer 11 may allow one to detect the aerodynamic noise produced by a vehicle 2 substantially exactly in the same conditions in which the aerodynamic noise is perceived by the driver, and thus allows one to detect the possible anomalies which may be perceived by the driver.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A method for measuring the aerodynamic noise of a vehicle, the method comprising:
    arranging the vehicle in a measuring station provided with a supporting element which carries at least one blower adapted to generate an air jet towards the vehicle;
    generating the air jet towards the vehicle by means of the blower carried by the supporting element;
    displacing, by means of an actuating device, the supporting element with respect to the vehicle from an initial position to a final position;
    measuring, by means of at least one phonometer, the aerodynamic noise produced by the vehicle struck by the air jet generated by the blower;
    communicating the measurements of the aerodynamic noise to a processing unit;
    detecting, with a position sensor the position of the supporting element with respect to the vehicle;
    communicating the measurements of the position to the processing unit;
    correlating, with the processing unit, the aerodynamic noise measurements supplied by the phonometer with the position of the supporting element with respect to the vehicle so that each aerodynamic noise measurement is associated to the position of the supporting element with respect to the vehicle at the time when the aerodynamic noise itself was measured;
    setting a maximum aerodynamic noise acceptability threshold for validating the vehicle and a minimum aerodynamic noise acceptability threshold for validating the correct operation of the system for measuring the aerodynamic noise;
    comparing the aerodynamic noise measurements supplied by the phonometer with the acceptability thresholds; and
    indicating as anomalies in the vehicle all of the aerodynamic noise measurements which exceed the maximum acceptability threshold and indicating as anomalies in the system for measuring the aerodynamic noise all of the aerodynamic noise measurements which are below the minimum acceptability threshold.

2. A method according to claim 1, wherein at least one of the minimum the aerodynamic noise acceptability threshold and the maximum aerodynamic noise acceptability threshold is variable according to the position of the supporting element with respect to the vehicle.

3. A method according to claim 1 comprising the further step of arranging the phonometer inside the vehicle before starting the measurements.

4. A method according to claim 3, wherein the phonometer comprises two separate right and left microphones for performing a stereophonic measurement of the aerodynamic noise.

5. A method according to claim 3 and comprising the further step of using an anthropomorphic phonometer comprising an anthropomorphic dummy, which is adapted to be rested on a seat of the vehicle and is provided with a head, and a pair of microphones, which are fixed to the head at the position occupied by the ears.

6. A method according to claim 1 comprising the step of displacing the supporting element with respect to the vehicle with an intermittent advancement in discrete steps which alternates a step of moving for the transition from a current position to a subsequent position and a step of halting; the measurement of the aerodynamic noise of the vehicle struck by the air jet generated by the blower is performed only during the steps of halting.

7. A method according to claim 1 comprising the step of displacing the supporting element with respect to the vehicle with a continuous advancement at a constant speed.

8. A system for measuring the aerodynamic noise of a vehicle, the system comprising:
    a measuring station adapted to receive the vehicle and which is provided with a supporting element;
    at least one blower carried by the supporting element and adapted to generate an air jet towards the vehicle;
    an actuating device adapted to displace the supporting element with respect to the vehicle from an initial position to a final position;
    at least one phonometer adapted to measure the aerodynamic noise produced by the vehicle struck by the air jet generated by the blower;
    a position sensor adapted to detect the position of the supporting element with respect to the vehicle; and
    a processing unit coupled to the phonometer and to the position sensor and adapted to receive the measurements of the aerodynamic noise and of the position of the supporting element with resect to the vehicle and to correlate the aerodynamic noise measurements supplied by the phonometer with the position of the supporting element with respect to the vehicle so that each aerodynamic noise measurement is associated to the position of the supporting element with respect to the vehicle at the time when the aerodynamic noise itself was measured;
    wherein the processing unit is further adapted
        to set a maximum aerodynamic noise acceptability threshold for validating the vehicle and a minimum aerodynamic noise acceptability threshold for validating the correct operation of the system for measuring the aerodynamic noise,
        to compare the aerodynamic noise measurements supplied by the phonometer with the acceptability thresholds, and
        to indicate as anomalies in the vehicle all of the aerodynamic noise measurements which exceed the maximum acceptability threshold and to indicate as anomalies in the system for measuring the aerodynamic noise all of the aerodynamic noise measurements which are below the minimum acceptability threshold.

9. A system according to claim 8, wherein the phonometer is adapted to be arranged inside the vehicle.

10. A system according to claim 9, wherein the phonometer comprises two separate right and left microphones for performing a stereophonic measurement of the aerodynamic noise.

11. A system according to claim 9, wherein the phonometer is anthropomorphic and comprises an anthropomorphic dummy, which is adapted to be rested on a seat of the vehicle and is provided with a head, and a pair of microphones, which are adapted to be fixed to the head at the position occupied by the ears.

12. A system according to claim 8, wherein the actuating device is adapted to displace the supporting element with respect to the vehicle with an intermittent advancement in discrete steps which alternates a step of moving for the transition from a current position to a subsequent position and a step of halting and wherein the measurement of the aerodynamic noise of the vehicle struck by the air jet generated by the blower is adapted to be performed only during the steps of halting.

13. A system according claim 8, wherein the actuating device is adapted to displace the supporting element with respect to the vehicle with a continuous advancement.

14. A method for measuring the aerodynamic noise of a vehicle, the method comprising:
    arranging the vehicle in a measuring station provided with a supporting element carrying at least one blower adapted to generate an air jet towards the vehicle;
    arranging at least one phonometer inside the vehicle;
    generating the air jet towards the vehicle by means of the blower carried by the supporting element;
    displacing, by means of an actuating device, the supporting element with respect to the vehicle from an initial position to a final position;
    measuring, by means of the phonometer, the aerodynamic noise produced by the vehicle struck by the air jet generated by the blower; and
    using an anthropomorphic phonometer comprising an anthropomorphic dummy, which is adapted to be rested on a seat of the vehicle and is provided with a head, and a pair of right and left microphones, which are fixed to the head at the position occupied by the ears to perform a stereophonic measurement of the aerodynamic noise.

15. A system for measuring the aerodynamic noise of a vehicle the system comprises:
    a measuring station adapted to receive the vehicle and which is provided with a supporting element;
    at least one blower carried by the supporting element and adapted to generate an air jet towards the vehicle;
    an actuating device for displacing the supporting element with respect to the vehicle from an initial position to a final position; and
    at least one phonometer for measuring the aerodynamic noise produced by the vehicle struck by the air jet generated by the blower;
    wherein the phonometer is anthropomorphic and comprises an anthropomorphic dummy, which is adapted to be rested on a seat of the vehicle and is provided with a head, and a pair of right and left microphones, which are fixed to the head at the position occupied by the ears and which are adapted to perform a stereophonic measurement for the aerodynamic noise.

* * * * *